July 15, 1947. J. R. SHEESLEY 2,424,001
RAILWAY CAR TRUCK
Filed Oct. 30, 1943 5 Sheets-Sheet 1

July 15, 1947.    J. R. SHEESLEY    2,424,001
RAILWAY CAR TRUCK
Filed Oct. 30, 1943    5 Sheets-Sheet 2

Inventor:
Jay R. Sheesley
By:
Zabel, Carlson, Fitzhaugh & Wells
Attorneys

July 15, 1947.  J. R. SHEESLEY  2,424,001
RAILWAY CAR TRUCK
Filed Oct. 30, 1943  5 Sheets-Sheet 3

Inventor:
Jay R. Sheesley
By:
Zabel, Carlson, Fitzhugh & Wells
Attorneys

July 15, 1947.　　　J. R. SHEESLEY　　　2,424,001
RAILWAY CAR TRUCK
Filed Oct. 30, 1943　　　5 Sheets-Sheet 4
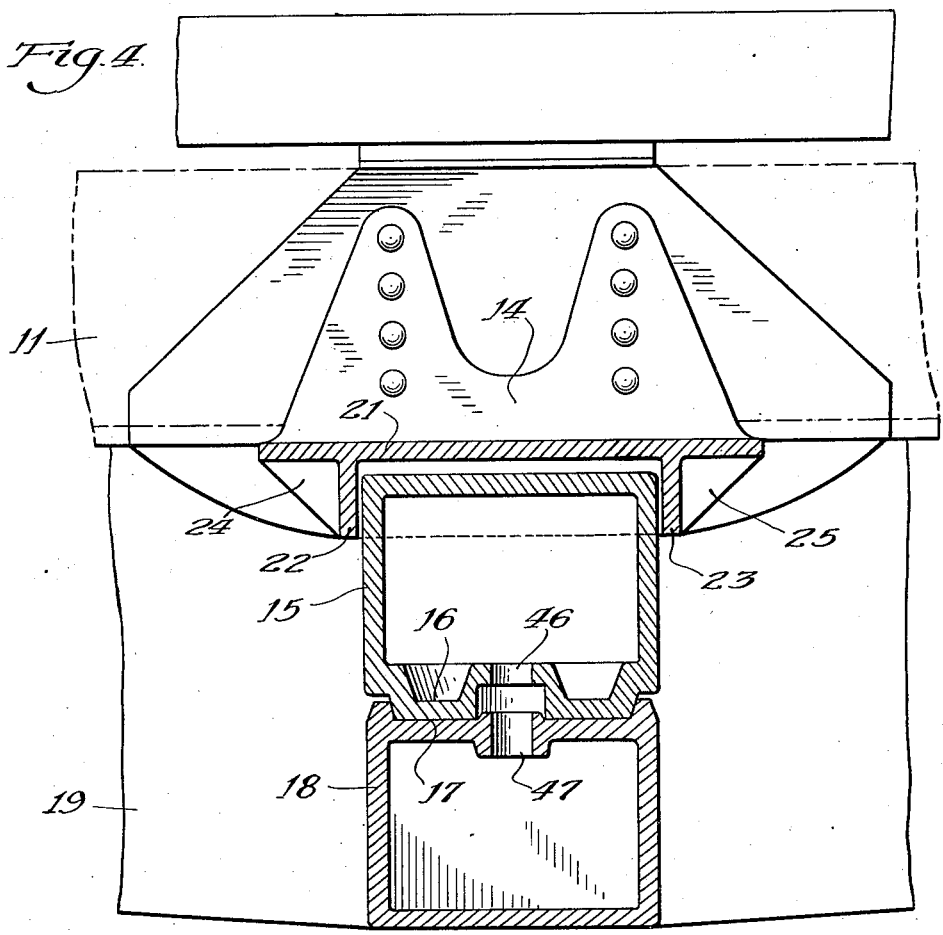
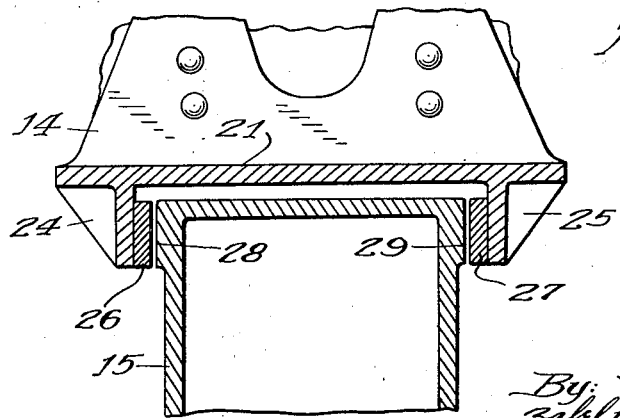
Inventor:
Jay R. Sheesley
By: Zabel, Carlson, Gritzbaugh & Wells
Attorneys July 15, 1947.  J. R. SHEESLEY  2,424,001
RAILWAY CAR TRUCK
Filed Oct. 30, 1943   5 Sheets-Sheet 5
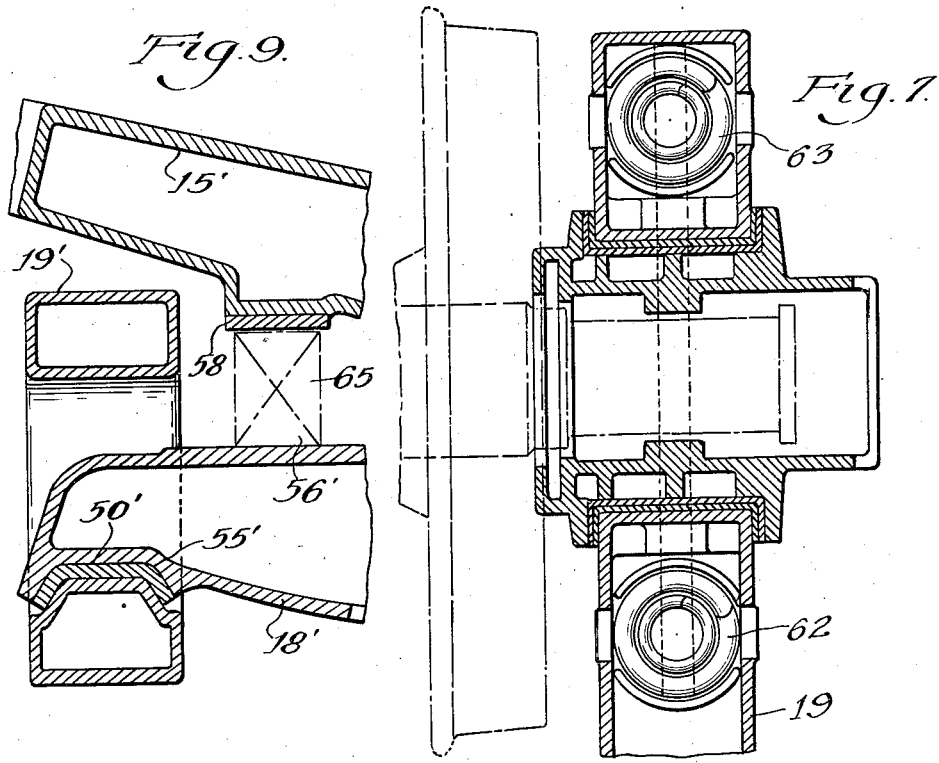
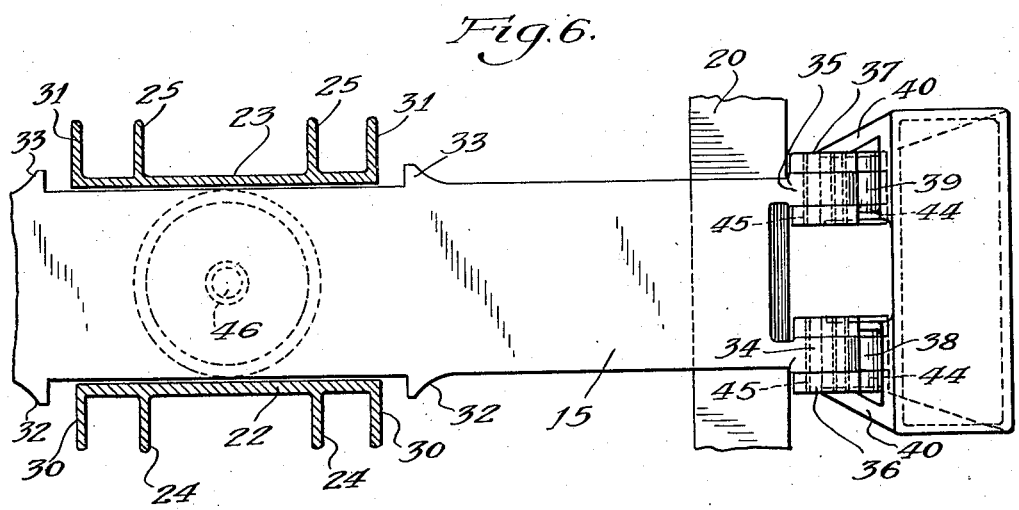
Inventor:
Jay R. Sheesley
By:
Zahl, Carlson, Fitzhugh & Wells
Attorneys Patented July 15, 1947

2,424,001

UNITED STATES PATENT OFFICE 2,424,001

RAILWAY CAR TRUCK

Jay R. Sheesley, Chicago, Ill.

Application October 30, 1943, Serial No. 508,313

3 Claims. (Cl. 105—201)

The present invention relates to improvements in railway car trucks and is particularly directed to improvements in a car body suspension and truck construction such as that shown in my prior Patent No. 2,268,267 dated December 30, 1941.

In my prior patent above referred to the load of the car body is suspended from a body suspension bolster which in turn is supported on the truck bolster by a center plate bearing of known construction.

The present invention is particularly applicable to freight car construction and embodies certain novel features of truck bolster and side frame construction in cooperation with the body suspension bolster whereby to provide a truck and suspension bolster construction that can be readily applied to a standard freight car body.

One of the purposes of the present invention is to provide an improved connection between the truck side frame, truck bolster and body suspension bolster whereby to simplify and improve the load-carrying characteristics of these parts. The present invention contemplates also a novel cooperation between the body suspension bolster and the standard body bolster of a car whereby adequate safety is provided for the car body in the limiting of lateral displacement of the body with respect to the truck and in the displacement of end thrust between the body, the body suspension bolster and the center plate bearing to the truck itself. In the present invention particular attention has been directed to simplification of the construction whereby to avoid any encroachment upon the space required for the brake mechanism of the car. Furthermore, the construction is such as to provide ready access to the suspension hangers which suspend the body from the suspension bolster and to the journal boxes where the truck side frames are supported by the axles of the car wheels.

The features and advantages of the invention will appear more fully as the description proceeds, reference being had to the accompanying drawings wherein a preferred form of the invention is shown. It is to be understood however that the drawings and description are illustrative only and are not to be taken as limiting the invention except insofar as it is limited by the claims.

In the drawings:

Fig. 4 is a sectional view taken substantially on the line 4—4 of Fig. 3;

Fig. 5 is a fragmentary sectional view similar to Fig. 4 but illustrating a slightly modified feature of the invention;

Fig. 6 is a fragmentary sectional view taken on the line 6—6 of Fig. 3;

Fig. 7 is a fragmentary sectional view taken on the line 7—7 of Fig. 2;

Fig. 9 is a fragmentary view showing an alternate side bearing construction where the truck bolster carries the conventional side bearing.

Figure 1:
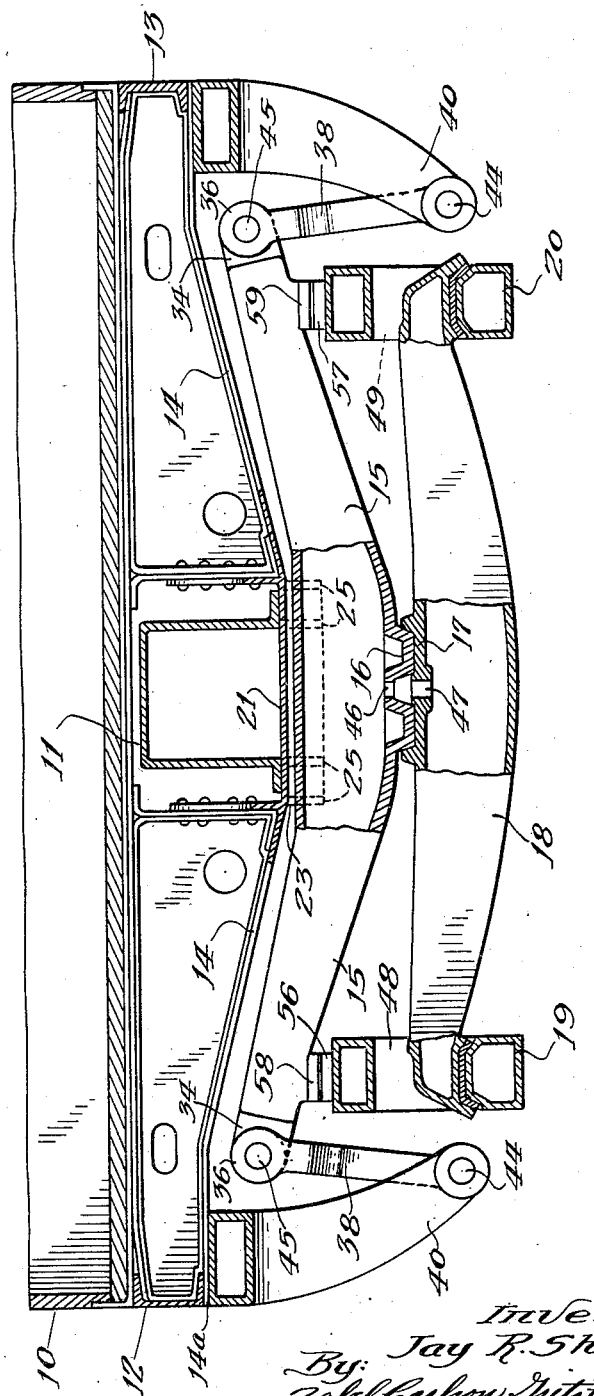
Fig. 1 is a transverse sectional view through a car truck and parts of the body showing my improved body suspension bolster and truck construction as applied to a standard freight car having the usual center sill and body bolster construction.

Referring now in detail to the drawings, the present invention is embodied in a railway car truck and suspension bolster construction particularly adapted for use with standard freight car bodies now in common use. As shown in Fig. 1 the freight car body is indicated diagrammatically at 10. The center sill of the freight car is indicated at 11 and the side sills are shown at 12 and 13. A body bolster 14 for the car is somewhat modified to receive a body suspension bolster 15 which is provided with a center plate bearing 16 which engages the corresponding bearing portion 17 on a truck bolster 18. The present invention concerns itself with the detailed relation between the body bolster 14, the body suspension bolster 15, the truck bolster 18 and the truck frames which are indicated at 19 and 20.

It will be noted (Figs. 1, 3 and 4) that the body bolster 14 has a heavy central portion 21 which is provided with spaced parallel ribs 22 and 23 extending lengthwise of the bolster or transversely of the car body. These parallel ribs 22 and 23 are reinforced strongly by webs such as are indicated at 24 and 25. The function of the ribs 22 and 23 is to transfer the end thrust of the car body to the body suspension bolster 15 and through it and the truck bolster to the truck frames. It is essential therefore that this construction be sufficiently rugged to perform the function desired. The ribs 22 and 23 fit closely on the opposite sides of the body suspension bolster 15. In fact, wherever it is desirable I may employ cushioning wear plates such as are indicated at 26 and 27 in Fig. 5 of the drawings and these cushioning wear plates which are fastened to the ribs 22 and 23 engage bearing surfaces 28 and 29 which may be provided on the opposite sides of the body suspension bolster 15.

The body suspension bolster is adapted to cooperate with the ribs 22 and 23 in such manner as to limit the endwise movement of this bolster with respect to the car body. The ribs 22 and 23 have end portions 30 and 31, respectively, at their opposite ends. The body suspension bolster 15 has two spaced lugs 32 projecting from the side thereof adjacent the rib 22. Likewise there are two spaced lugs 33 projecting from the side of the body suspension bolster adjacent to the rib 23. These lugs are formed integral on the body suspension bolster, and the spacing between a pair of lugs is greater than the length of the corresponding rib so that the body suspension bolster may move endwise with respect to the ribs a predetermined amount.

Figure 2:
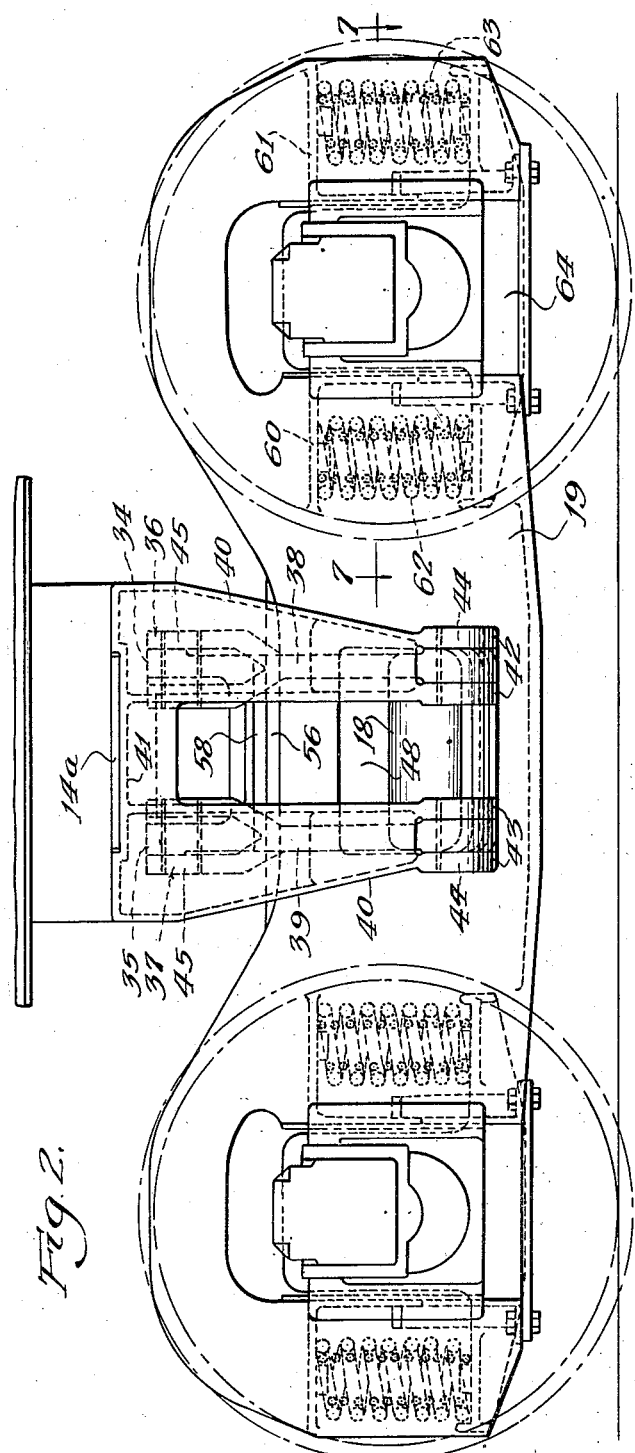
Fig. 2 is a side view of a truck.
Figure 3:
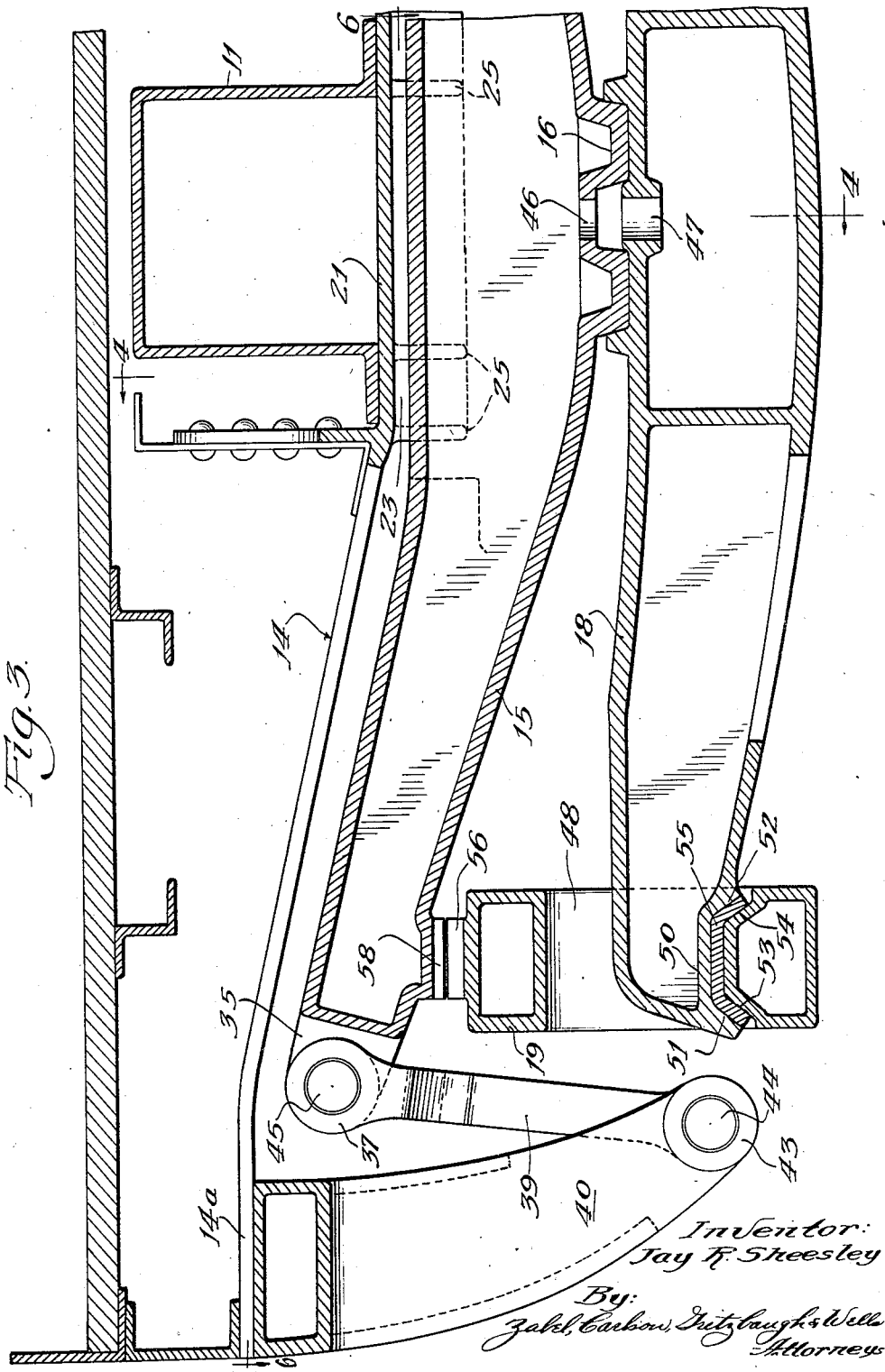
Fig. 3 is an enlarged transverse sectional view similar to Fig. 1 but showing the mounting of the truck bolster in the truck side frame in greater detail.

Each end of the body suspension bolster 15 has two spaced bearing portions 34 and 35 (see Figs. 3 and 6). These bearing portions 34 and 35 are adapted to receive the upper bifurcated ends 36 and 37 of two suspension hangers 38 and 39. These suspension hangers 38 and 39 at each end of the bolster 15 have their lower ends pivoted to the lower ends of corresponding body suspension brackets 40 which are provided at the opposite sides of the car body. These brackets 40 are substantial castings which are permanently secured against the side sills 12 and 13 of the car body directly beneath the body bolster. Each bracket has its top surface recessed as indicated at 41 (see Fig. 2) to receive the end 14a of the body bolster 14. The brackets 40 have two spaced portions 42 to receive the lower end of a hanger 38 therebetween and two spaced portions 43 to receive the lower end of the hanger 39 therebetween. Bearing pins 44 are journaled in the hangers 38 and 39 and secured in the portions 42 and 43. Likewise the bifurcated upper ends of the hangers 38 and 39 carry bearing pins 45 which are journaled in the end portions 34 and 35 of the body suspension bolster.

The function of the hangers 38 and 39 and the brackets 40 is to suspend the car body from the ends of the body suspension bolster 15 so that the body is free to sway laterally with respect to the bolster 15 and thus absorb lateral shocks that may be communicated to the bolster 15 through the truck frame. In order to prevent undue swaying of the body the hangers are set slightly off vertical so that they both diverge downwardly. The reason for this is brought out in my prior patent and it will not be further described here.

Referring now to the truck bolster 18 and the body suspension bolster, I have shown the body suspension bolster 15 as provided with a center plate bearing 16 cooperating with the corresponding bearing 17 on the truck bolster 18. Suitable provision is indicated at 46 and 47 to receive a center pin coupling the bolsters 15 and 18 together in the usual manner of coupling a center plate bearing. The only distinction made here over a conventional center plate bearing is that the center plate bearing is not on the body bolster and the truck bolster but is now on the body suspension bolster and the truck bolster the same as it is in my prior patent. I have however provided a new construction including changes in the truck bolster—side frame relation and in the side bearings as will be brought out by the following description.

The truck bolster 18 is carried in the two side frames 19 and 20 of the truck itself. These side frames have windows 48 and 49 receiving the ends of the bolster 18. Fig. 3 shows this construction in section. The side frames 19 and 20 are castings in which the windows 48 and 49 are formed. The opposite ends of the bolster 18 are formed to provide transversely running recesses 50 on the under surface thereof to provide bearing surfaces. These recesses have two sloping surfaces 51 and 52 and the lower walls of the windows 48 and 49 have correspondingly shaped bearing surfaces 53 and 54. A suitable yielding bearing material 55, such as that sold in the trade under the name "Fabreeka," is interposed between the surfaces just mentioned and secured in place in the truck bolster recess 50. This bearing construction provides the truck bolster with the proper support on the truck side frames that will permit a limited amount of play without binding due to rise and fall of the truck side frames. The bearing also tends to maintain alignment yet it allows slight freedom to take care of lateral and endwise working of the side frames with respect to the truck bolster on curves. This gives what I term a self squaring feature.

The side frames 19 and 20 are adapted to cooperate with the body suspension bolster 15 in limiting the amount of tilting of the bolster. To this end the side frames 19 and 20 are provided with bearing surfaces 56 and 57, respectively, on their top surfaces. The body suspension bolster 15 has corresponding bearing members 58 and 59 thereon. The bolster 15 is free to turn with respect to the bolster 18 and the bearing surfaces therefore are made of sufficient length to accommodate the bolsters in all positions.

Figure 8:
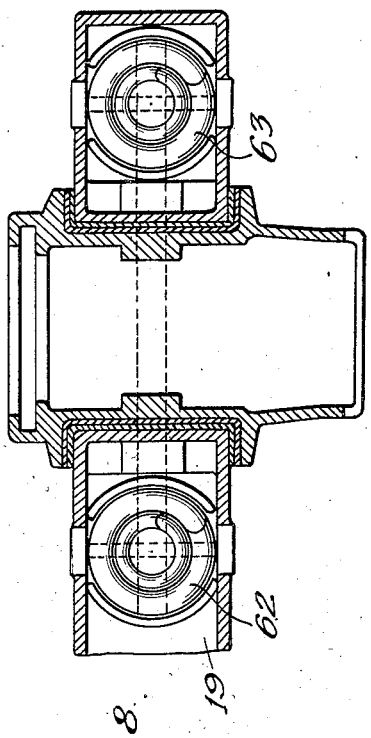
Fig. 8 is a fragmentary sectional view taken on the same line as Fig. 7 but illustrating a modification of the journal box and spring suspension construction.

Figs. 2, 7 and 8 illustrate the spring pedestal housing parts of the side frames. Fig. 7 shows one type of journal box while Fig. 8 shows another journal box application with the standard A. A. R. pedestal opening. As shown, the side frames are provided with webs 60, 61 resting on the springs 62 and 63 which in turn rest on the spring pedestal 64. Inasmuch as the journal box and pedestal construction are not a part of my invention the details thereof will not be described further herein.

The particular advantages in the present structure lie in the combination between the body bolster of the car, the body suspension bolster, the truck bolster and the truck side frames. By this combination the load of the body is transmitted through the suspension brackets 40 and the hangers 38 and 39 to the body suspension bolster 15. End thrust of the body however is transmitted directly from the body bolster portion 21 to the body suspension bolster 15 through the ribs 22 and 23. This eliminates strain on the hangers 38 and 39 and the brackets 40. Moreover in the case of any damage or destruction to the hangers themselves, the body bolster portion 21 simply drops down onto the body suspension bolster 15. The clearance between the body suspension bolster and the portion 21 can be very small since it is very slightly affected by lateral movement of the body with respect to the bolster. The entire assembly is greatly simplified by providing the windows in the side frames with saddles on which the ends of the truck bolster are supported. Strain is eliminated from the center plate bearing due to tilting of the body suspension bolster by reason of the bearings provided at 56—58 and 57—59. I have purposely avoided showing any of the brake gear which would only confuse the showing of the present features that are considered of importance. It will be noted however that the suspension bolster and its hangers and brackets will not in any way interfere with the positioning of the brake rigging on the side frames themselves.

The particular connection between the side frames and the truck bolster is a feature of my invention. It includes the "saddle" arrangement and the resilient yielding material interposed between the bolster surface and the frame surface. In operation the connection allows one side frame to be slightly lower at one end than the other without throwing undue strain on any part of the bearing surface. Also, if one side frame lags the other slightly (as it sometimes does on a curve) or if the correct right angle relation between a side frame and the bolster is deviated from temporarily at any time, the bearing between the bolster and side frame allows the slight deviation but yieldingly opposes it thus providing self-squaring of the frames.

The placing of the side bearing directly on the side frame and on the bolster is another feature. It gives a greater stability against roll of the car body than the conventional side bearing provided on the truck bolster as shown in Fig. 9. This is because the side bearing is considerably farther away from the center plate bearing. The construction does place the side bearing slightly above the axle bearing so that any substantial outward thrust at the side bearing would tend to tip the side frame outwardly. There can be not such thrust however because the main lateral thrust resistance occurs at the center plate bearing which is slightly below the axle bearing.

In the modified construction shown in Fig. 9 the side bearing is shown at 65 as conventionally placed between the two bolsters 15' and 18'. This construction however does not have the advantages of the novel side bearing arrangement hereinbefore described.

From the foregoing description it is believed that the nature and advantages of the present invention will be readily apparent to those skilled in this art.

Having thus described my invention, what I claim as new and desire to secure by Letters Patent is:

1. In combination, truck side frames having means for mounting on car wheel axles, said side frames having means to mount a truck bolster, a truck bolster mounted thereon and having a center bearing, a second bolster having a center bearing on the first bearing and having means thereon for movably supporting a car body in spaced relation thereto above the second bolster, the truck bolster mounting means comprising a saddle bearing portion on each side frame having opposed, upwardly facing, sloping, bearing surfaces, and opposed, downwardly facing bearing surfaces on each end of the truck bolster fitting over said saddle bearing portions, side bearings on the tops of the side frames and bearing members on the second bolster for riding on said side bearings.

2. In combination, truck side frames having means for mounting on car wheel axles, said side frames having means to mount a truck bolster, a truck bolster mounted thereon and having a center bearing, a second bolster having a center bearing on the first bearing and having means thereon for movably supporting a car body in spaced relation thereto above the second bolster, each side frame having a window therein, the lower wall of the window forming a saddle bearing portion having opposed upwardly facing, sloping, bearing surfaces, and the truck bolster having its ends formed to provide opposed, sloping, downwardly facing, bearing portions adapted to fit over the upwardly facing bearing portions of the side frames, side bearings on the tops of the side frames over said windows, and bearing members on the second bolster for riding on said side bearings.

3. A railway car body and supporting means therefor, comprising truck side frames having journal box pedestals whereby they may be supported from the car wheel axles, said side frames having windows therein provided with saddle portions, a truck bolster having its ends supported by said saddle portions and having a center bearing plate, a suspension bolster having a center bearing plate supported on said first named bearing plate, hangers pivotally mounted on the ends of said suspension bolster, brackets pivotally mounted on the lower ends of said hangers and extending upwardly outside the hangers, said brackets having means to mount the car body thereon, and means to transfer endwise draft and brake thrusts direct from the car body to the suspension bolster whereby to protect the brackets and hangers, comprising a body bolster having a central portion provided with transverse ribs spaced apart to admit the center sill, and depending integral ribs at its side edges, between the first named ribs and at right angles thereto, spaced apart to receive the central part of the suspension bolster therebetween, whereby the brake and draft endwise thrusts are carried centrally through the body and suspension bolsters between the body and the truck bolster, said body suspension bolster having shoulders adjacent to the opposite ends of the depending ribs and aligned therewith whereby said ribs serve to limit endwise displacement of the body bolster with respect to the body suspension bolster.

JAY R. SHEESLEY.

REFERENCES CITED

The following references are of record in the file of this patent:

UNITED STATES PATENTS

| Number | Name | Date |
| --- | --- | --- |
| 2,268,267 | Sheesley | Dec. 30, 1941 |
| 2,211,462 | Hobson | Aug. 13, 1940 |
| 418,028 | Jewett | Dec. 24, 1889 |
| 2,066,602 | Barrows et al. | Jan. 5, 1937 |
| 993,755 | Chamberlin | May 30, 1911 |
| 1,237,167 | Burrmann | Aug. 14, 1917 |
| 1,092,357 | Hansen | Apr. 7, 1914 |
| 1,760,181 | Stertzbach et al. | May 27, 1930 |

FOREIGN PATENTS

| Number | Country | Date |
| --- | --- | --- |
| 447,291 | Great Britain | May 15, 1936 |